US012640880B2

(12) United States Patent
Wang et al.

(10) Patent No.: US 12,640,880 B2
(45) Date of Patent: May 26, 2026

(54) INDICATION METHOD, REFERENCE SIGNAL SENDING METHOD, COMMUNICATION NODE, AND STORAGE MEDIUM

(71) Applicant: ZTE CORPORATION, Shenzhen (CN)

(72) Inventors: Yuxin Wang, Shenzhen (CN); Hao Wu, Shenzhen (CN); Zhaohua Lu, Shenzhen (CN); Yong Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 284 days.

(21) Appl. No.: 18/382,192

(22) Filed: Oct. 20, 2023

(65) Prior Publication Data

US 2024/0063976 A1 Feb. 22, 2024

Related U.S. Application Data

(63) Continuation of application No. PCT/CN2022/107007, filed on Jul. 21, 2022.

(30) Foreign Application Priority Data

Nov. 5, 2021 (CN) .......................... 202111307869.7

(51) Int. Cl.
*H04W 4/00* (2018.01)
*H04L 5/00* (2006.01)
*H04W 72/232* (2023.01)

(52) U.S. Cl.
CPC ............ *H04L 5/0051* (2013.01); *H04L 5/001* (2013.01); *H04W 72/232* (2023.01)

(58) Field of Classification Search
CPC ........... H04W 72/232; H04W 72/0457; H04W 72/0446; H04L 5/0051; H04L 5/001; H04L 5/0053
See application file for complete search history.

(56) References Cited

U.S. PATENT DOCUMENTS

2021/0058910 A1* 2/2021 Yokomakura ......... H04L 5/0048
2023/0069777 A1* 3/2023 Chung .................. H04L 1/1812
(Continued)

FOREIGN PATENT DOCUMENTS

| CN | 113541901 | 10/2021 |
| WO | WO2021/098059 | 5/2021 |
| WO | WO2021/155492 | 8/2021 |

OTHER PUBLICATIONS

Nokia, "Introduction of Cross-carrier Scheduling with Different Numerologies," SGPP Draft; RP-192645, 3rd Generation Partnership Project (3GPP), Mobile Competence Centre, Dec. 2019, retrieved from https://ftp.3gpp.org/tsg_ran/TSG_RAN/TSGR_86/Docs/EP-192645.zip, 13 pages.

(Continued)

*Primary Examiner* — Abdelnabi O Musa
(74) *Attorney, Agent, or Firm* — Crowell & Moring LLP

(57) ABSTRACT

Provided are an indication method, a reference signal sending method, a communication node and a storage medium. The indication method includes that: a bit width of a slot offset indication (SOI) field is determined according to the number of slot indication parameters configured in a reference signal resource set of an indication unit; and downlink control information (DCI) is sent, where the DCI includes the SOI field.

18 Claims, 2 Drawing Sheets

Determine a bit width of a slot offset indication (SOI) domain according to the number of slot indication parameters configured in a reference signal resource set of an indication unit ⟍ 110

Send downlink control information (DCI), where the DCI includes the SOI domain ⟍ 120

(56) References Cited

U.S. PATENT DOCUMENTS

| 2023/0114925 A1* | 4/2023 | Yang | H04W 72/0446 |
| 2023/0261834 A1* | 8/2023 | Shi | H04W 72/231 |
| | | | 370/329 |
| 2024/0243881 A1* | 7/2024 | Chung | H04L 5/0053 |
| 2024/0251421 A1* | 7/2024 | Ma | H04L 5/005 |
| 2025/0008538 A1* | 1/2025 | Sun | H04W 72/0446 |

OTHER PUBLICATIONS

Vivio, "Further discussion on SRS enhancement," 3GPP Draft; RI-2102511, 3rd Generation Partnership Project (3GPP), Mobile Competence Centre, Apr. 2021, retrieved from https://ftp.3gpp.org/tsg_ran/WG1_RL1/TSGR1_104b-e/Docs/R1-2102511.zip, 22 pages.

Extended European Search Report issued in European application No. 228889089, dated Sep. 6, 2024, 14 pages.

International Search Report issued Oct. 10, 2022 in International (PCT) Application No. PCT/CN2022/107007.

Futurewei. "Enhancements on SRS Flexibility, Coverage and Capacity" *3GPP TSG RAN WGJ Meeting* #106bis-e R1-2108794, Oct. 19, 2021 (Oct. 19, 2021), section 2.

ZTE. "Enhancements on SRS Flexibility, Coverage and Capacity" *3GPP TSG RAN WGJ Meeting* #106bis-e R1-2108875, Oct. 19, 2021 (Oct. 19, 2021), section 2.

Office action issued in Canadian application No. 3,216,286, dated Jan. 7, 2025, 4 pages.

* cited by examiner

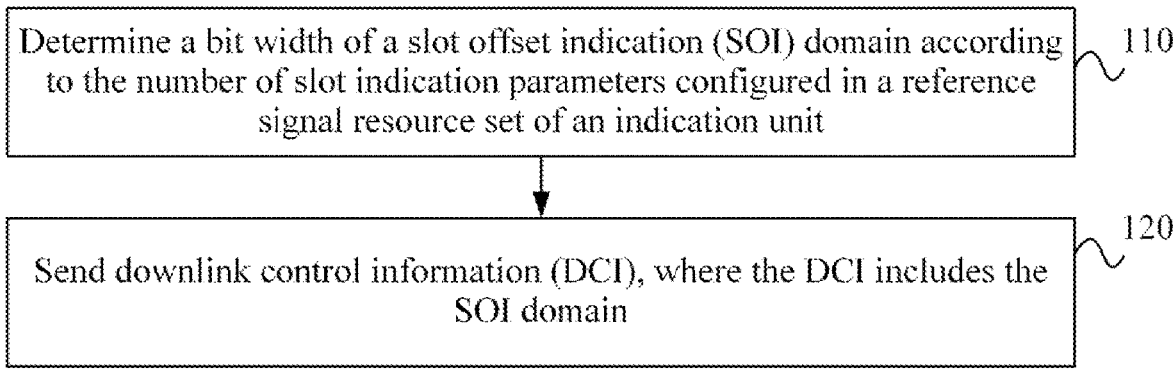

Determine a bit width of a slot offset indication (SOI) domain according to the number of slot indication parameters configured in a reference signal resource set of an indication unit ⌇ 110

Send downlink control information (DCI), where the DCI includes the SOI domain ⌇ 120

FIG. 1

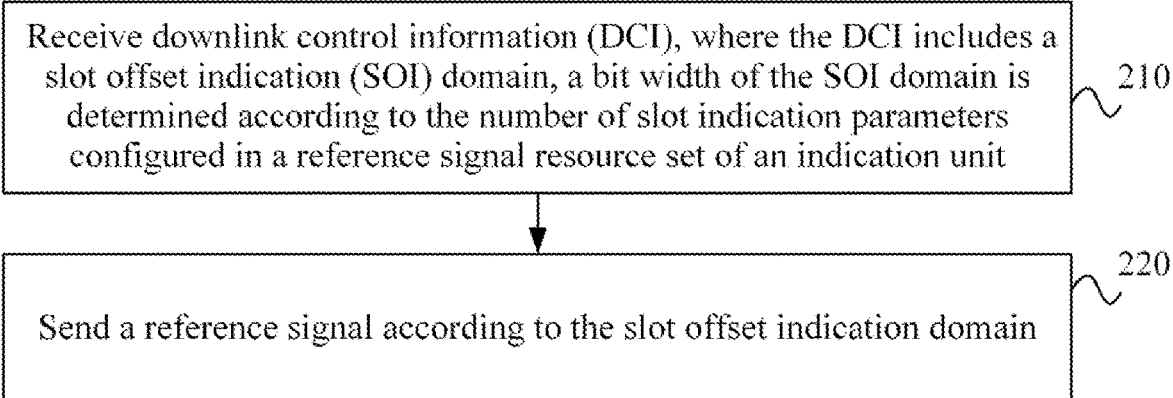

Receive downlink control information (DCI), where the DCI includes a slot offset indication (SOI) domain, a bit width of the SOI domain is determined according to the number of slot indication parameters configured in a reference signal resource set of an indication unit ⌇ 210

Send a reference signal according to the slot offset indication domain ⌇ 220

FIG. 2

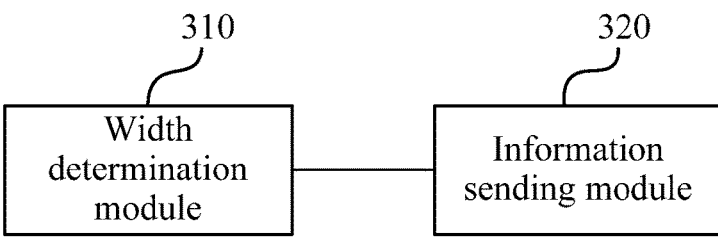

310                    320

| Width determination module | Information sending module |

FIG. 3

INDICATION METHOD, REFERENCE SIGNAL SENDING METHOD, COMMUNICATION NODE, AND STORAGE MEDIUM

This application is a continuation application of PCT International Application No. PCT/CN2022/107007, filed on Jul. 21, 2022, which claims priority to Chinese Patent Application No. 202111307869.7, filed with the China National Intellectual Property Administration on Nov. 5, 2021, wherein the content of the above-referenced applications is incorporated herein by reference in its entirety.

TECHNICAL FIELD

The present application relates to the technical field of wireless communication networks, and for example, an indication method, a reference signal sending method, a communication node and a storage medium.

BACKGROUND

A slot offset indication (SOI) field in downlink control information (DCI) is used for indicating that a terminal sends a sounding reference signal (SRS) on a specific slot. In a case of a carrier aggregation (CA) or of multiple bandwidth parts (BWPs) configured within one carrier, the SRS is triggered across CCs or across BWPs at a network side, slot offsets of the SRS sent on different CCs or different BWPs may be different, which complicates the indication of an SRS sending slot. If the slot at which the SRS is sent cannot be correctly indicated, it may result in a failed SRS transmission.

SUMMARY

The present application provides an indication method, a reference signal sending method, a communication node and a storage medium.

An embodiment of the present application provides an indication method, the indication method includes that: a bit width of a slot offset indication (SOI) field is determined according to the number of slot indication parameters configured in a reference signal resource set of an indication unit; and downlink control information (DCI) is sent, where the DCI includes the SOI field.

An embodiment of the present application further provides a reference signal sending method. The method includes that: downlink control information (DCI) is received, where the DCI includes a slot offset indication (SOI) field, a bit width of the SOI field is determined according to the number of slot indication parameters configured in a reference signal resource set of an indication unit; and a reference signal is sent according to the SOI field.

An embodiment of the present application further provides a communication node. The communication node includes one or more processors and a storage device. The storage device is configured to store one or more programs. The one or more programs, when executed by the one or more processors, cause the one or more processors to implement the indication method or the reference signal sending method described above.

An embodiment of the present application further provides a computer-readable storage medium. The computer-readable storage medium stores a computer program, where the computer program, when executed by a processor, implements the indication method or the reference signal sending method described above.

BRIEF DESCRIPTION OF DRAWINGS

FIG. 1 is a flowchart of an indication method provided in an embodiment;

FIG. 2 is a flowchart of a reference signal sending method provided in an embodiment;

FIG. 3 is a schematic structural diagram of an indication device provided in an embodiment;

DETAILED DESCRIPTION

Figure 4:
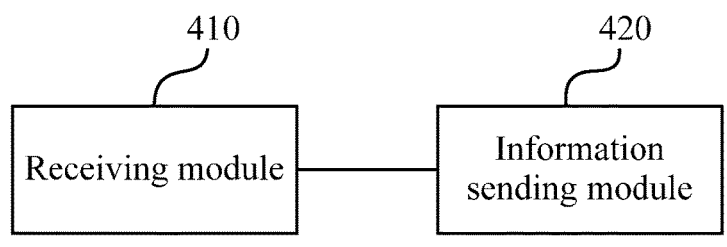
FIG. 4 is a schematic structural diagram of a reference signal sending device provided in an embodiment.

The present application will be described in conjunction with the drawings and embodiments below. The specific embodiments described herein are merely used for explaining the present application. For ease of description, only parts related to the present application are shown in the drawings.

In an embodiment of the present application, an indication method is provided, in this method, a bit in a SOI field corresponding to one indication unit may be used for indicating other indication units by uniformly setting a bit width of a SOI field of each indication unit, so that the indication of crossing the indication unit of an SRS sending slot is achieved, and the reliability and the flexibility of the indication of a reference signal being sending the slot are improved.

FIG. 1 is a flowchart of an indication method provided in an embodiment. The method may be applied to a first communication node, for example a network side device such as a base station. As shown in FIG. 1, the method provided in this embodiment includes a step 110 and a step 120.

In step 110, a bit width of a slot offset indication (SOI) field is determined according to the number of slot indication parameters configured in a reference signal resource set of an indication unit.

In step 120, downlink control information (DCI) is sent, where the DCI includes the SOI field.

In this embodiment, the indication unit is a unit indicating an SRS sending slot, which may be CC or BWP. The reference signal mainly refers to an aperiodic SRS. The SOI field in the DCI is used for indicating that a second communication node (such as, a terminal) sends the reference signal on a $(t+1)$-th available slot, where t is the slot indication parameter and is a key parameter for determining the sending of the reference signal. For the $(t+1)$-th available slot, whose counted reference point may be a slot n or a slot $n+k$, where the slot n is a slot in which the second communication node receives the DCI triggering the reference signal, and k is a slot offset parameter configured in a higher layer radio resource control (RRC) parameter (slotOffset).

In this embodiment, multiple slot indication parameters t may be configured in the reference signal resource set for each indication unit, for example, 3 CCs are configured, denoted as CC 0, CC 1, and CC 2, the number of t values configured in an aperiodic SRS resource set on the CC 0 is 2, the number of t values configured in an aperiodic SRS resource set on the CC 1 is 4, and the number of t values configured in an aperiodic SRS resource set on the CC 2 is 2. The bit width of the SOI field may be determined according to the number of slot indication parameters configured in a reference signal resource set of each indication unit. For example, for the CC 0, the number of t values are configured to be 2, then the bit width of the SOI field may be $\log_2 2$, i.e., 1 bit may be used to indicate which t value is adopted. As another example, in order to make enough bits available in a SOI field corresponding to the CC 0 to indicate the t value of the CC 1, the SOI field of the CC 0 may be extended to 2 bits, so as to indicate which t value of the number 4 of t values configured by the CC 1 is adopted.

On the above basis, the first communication node may uniformly configure a bit width of a SOI field of each indication unit, so that the indication of crossing the indication unit of an SRS sending slot is achieved, and the reliability and the flexibility of the indication of a reference signal being sending the slot are improved.

In an embodiment, that the bit width of the SOI field is determined according to the number of slot indication parameters configured in the reference signal resource set of the indication unit includes: a bit width of a SOI field corresponding to each indication unit is determined according to a maximum value of the numbers of slot indication parameters configured in reference signal resource sets of all indication units; where the bit width of the SOI field corresponding to each indication unit is the same.

In this embodiment, a bit width of a SOI field corresponding to each indication unit is the same and depends on a maximum value of the numbers of slot indication parameters configured in the reference signal resource set of each indication unit. For example, the number of t values configured in the aperiodic SRS resource set on the CC 0 is 2, the number of t values configured in the aperiodic SRS resource set on the CC 1 is 4, and the number of t values configured in the aperiodic SRS resource set on the CC 2 is 2, where a maximum number of t values configured in the aperiodic SRS resource set is 4, then a bit width of a SOI field corresponding to each CC is $\log_2 4$, i.e., 2.

Similarly, if in one CC, the number of t values configured in an aperiodic SRS resource set on a BWP 0 is 2, the number of t values configured in an aperiodic SRS resource set on a BWP 1 is 4, and the number of t values configured in an aperiodic SRS resource set on a BWP 2 is 2, where a maximum number oft values configured in the aperiodic SRS resource set is 4, then a bit width of a SOI field corresponding to each BWP is $\log_2 4 = 2$.

In an embodiment, the multiple indication units include a first indication unit and a second indication unit, the first indication unit includes an indication unit of which the number of slot indication parameters configured in the reference signal resource set is less than the maximum value, and the second indication unit includes an indication unit of which the number of slot indication parameters configured in the reference signal resource set is equal to the maximum value; and all or part of bits in a SOI field corresponding to the first indication unit is used for indicating a value of a slot indication parameter in a reference signal resource set of the second indication unit or selecting a slot indication parameter in a reference signal resource set of the second indication unit.

In this embodiment, a bit width of a SOI field corresponding to each indication unit is the same and depends on a maximum value of the numbers of slot indication parameters configured in the reference signal resource set of each indication unit. The indication unit is divided into two categories, one category is a first indication unit, the number of slot indication parameters configured in a reference signal resource set of the first indication unit is not a maximum value of the number of slot indication parameters corresponding to each indication unit, that is, the bit width of the SOI field corresponding to the first indication unit is determined by the number of slot indication parameters configured in a reference signal resource set of other indication units; another category is a second indication unit, the number of slot indication parameters configured in a reference signal resource set of the second indication unit is a maximum value of the numbers of slot indication parameters corresponding to each indication unit, that is, the bit width of the SOI field corresponding to the second indication unit is determined by the number of slot indication parameters configured in its own reference signal resource set. For example, the number of t values configured in the aperiodic SRS resource set on the CC 0 is 2, the number of t values configured in the aperiodic SRS resource set on the CC 1 is 4, and the number of t values configured in the aperiodic SRS resource set on the CC 2 is 2, then both the CC 0 and the CC 2 are the first indication unit and the CC 1 is the second indication unit.

In this embodiment, for the indication of the slot indication parameter t inside the first indication unit, by using part of bits in the SOI field corresponding to the first indication unit, a value of the slot indication parameter in the reference signal resource set of the SOI field corresponding to the first indication unit may be indicated or the slot indication parameter in the reference signal resource set of the SOI field corresponding to the first indication unit may be selected. For example, for a SOI field on the CC 0 (with a bit width of 2 bits), a t value on the CC 0 may be indicated or selected by using an upper 1-bit bit or a lower 1-bit bit; for a SOI field on the CC 2 (with a bit width of 2 bits), and a t value on the CC 2 may be indicated or 0 selected by using the SOI with an upper 1-bit bit or a lower 1-bit bit.

In this embodiment, for the indication of the slot indication parameter t across the indication unit, all or part of bits in a SOI field corresponding to the first indication unit may be used for indicating a value of a slot indication parameter in a reference signal resource set of the second indication unit or selecting a slot indication parameter in a reference signal resource set of the second indication unit. For example, a t value on the CC 1 may be indicated or selected by using the SOI field on the CC 0, then all bits (2 bits) of the SOI field of the CC 0 may be used to indicate or select t value on CC 1, a total of four may be indicated or selected; the value of t on the CC 1 may also be indicated or selected by using part of bits (1 bit, which may be the upper bit or the lower bit) of the SOI field of the CC 0, a total of two may be indicated or selected. The above examples are equally applicable to multiple BWPs in a CC.

In an embodiment, the multiple indication units include a first indication unit and a second indication unit, the first indication unit includes an indication unit of which the number of slot indication parameters configured in the reference signal resource set is less than the maximum value, and the second indication unit includes an indication unit of which the number of slot indication parameters configured in the reference signal resource set is equal to the maximum value; and part of bits in a SOI field corresponding to the second indication unit is used for indicating a value of a slot indication parameter in a reference signal resource set of the first indication unit or selecting a slot indication parameter in a reference signal resource set of the first indication unit.

In this embodiment, a bit width of a SOI field corresponding to each indication unit is the same and depends on a maximum value of the numbers of slot indication parameters configured in the reference signal resource set of each indication unit. The multiple indication units are divided into two categories. For example, the number of t values configured in the aperiodic SRS resource set on the CC 0 is 2, the number of t values configured in the aperiodic SRS resource set on the CC 1 is 4, and the number of t values configured in the aperiodic SRS resource set on the CC 2 is 2, then both the CC 0 and the CC 2 are the first indication unit and the CC 1 is the second indication unit.

In this embodiment, for the indication of the slot indication parameter t across the indication unit, part of bits in a SOI field corresponding to the second indication unit may be used for indicating a value of a slot indication parameter in a reference signal resource set of the first indication unit or selecting a slot indication parameter in a reference signal resource set of the first indication unit. For example, t values on the CC 0 or the CC 2 are indicated or selected by using the SOI field on the CC 1, t values on the CC 0 or the CC 2 are indicated or selected by using SOI of an upper 1-bit bit or a lower 1-bit bit of the SOI field on the CC 1, whereby the indication across the time field unit can be achieved. The above examples are equally applicable to multiple BWPs in a CC.

In an embodiment, that the bit width of the SOI field is determined according to the number of slot indication parameters configured in the reference signal resource set of the indication unit includes: a bit width of a SOI field corresponding to each indication unit is determined according to the number of slot indication parameters configured in a reference signal resource set of each indication unit.

In this embodiment, bit width of SOI fields corresponding to the multiple indication units may be different and the bit width of the SOI field corresponding to each indication unit depends on the number of slot indication parameters configured in the reference signal resource set of each indication unit. For example, the number of t values configured in the aperiodic SRS resource set on the CC 0 is 2, the number of t values configured in the aperiodic SRS resource set on the CC 1 is 4, and the number of t values configured in the aperiodic SRS resource set on the CC 2 is 2, then a SOI bit width on the CC 0 is $\log_2 2 = 1$, a SOI bit width on the CC 1 is $\log_2 4 = 2$, and a SOI bit width on the CC 2 is $\log_2 2 = 1$. The above examples are equally applicable to multiple BWPs in a CC.

In an embodiment, the multiple indication units include a third indication unit and a fourth indication unit, the number of slot indication parameters configured in a reference signal resource set of the third indication unit is less than the number of slot indication parameters configured in a reference signal resource set of the fourth indication unit; and part of bits in a SOI field corresponding to the fourth indication unit is used for indicating a value of a slot indication parameter in a reference signal resource set of the third indication unit or selecting a slot indication parameter in a reference signal resource set of the third indication unit.

In this embodiment, a bit width of a SOI field corresponding to each indication unit depends on the number of slot indication parameters configured in the reference signal resource set of the indication unit. The multiple indication units are divided into two categories, one category is a third indication unit, another category is a fourth indication unit, the number of slot indication parameters configured in the reference signal resource set of the third indication unit is less than the number of slot indication parameters configured in the reference signal resource set of the fourth indication unit, that is, the bit width of the SOI field corresponding to the third indication unit is less than the bit width of the SOI field corresponding to the fourth indication unit. For example, the number of t values configured in the aperiodic SRS resource set on the CC 0 is 2, the number of t values configured in the aperiodic SRS resource set on the CC 1 is 4, and the number of t values configured in the aperiodic SRS resource set on the CC 2 is 2, then the CC 0 and the CC 2 are each the third indication unit and the CC 1 is the fourth indication unit.

In this embodiment, for the indication of the slot indication parameter t across the indication unit, part of bits in a SOI field corresponding to the fourth indication unit may be used for indicating or selecting a value of a slot indication parameter in a reference signal resource set of the third indication unit. For example, t values on the CC 0 or the CC 2 are indicated or selected using the upper 1-bit bit or the lower 1-bit bit in the 2-bit SOI field on the CC 1. The above examples are equally applicable to multiple BWPs in a CC.

In an embodiment, the multiple indication units include a third indication unit and a fourth indication unit, the number of slot indication parameters configured in a reference signal resource set of the third indication unit is less than the number of slot indication parameters configured in a reference signal resource set of the fourth indication unit; where after the upper bit or the lower bit in the SOI field corresponding to the third indication unit is filled with 0 or 1, bits in the SOI field corresponding to the third indication unit is used for indicating a value of a slot indication parameter in the reference signal resource set of the fourth indication unit or selecting a slot indication parameter in the reference signal resource set of the fourth indication unit; and where a size of the SOI field corresponding to the third indication unit after the upper bit or the lower bit in the SOI field corresponding to the third indication unit is filled with 0 or 1 is equal to a size of a SOI field corresponding to the fourth indication unit.

In this embodiment, a bit width of a SOI field corresponding to each indication unit depends on the number of slot indication parameters configured in the reference signal resource set of the indication unit. The multiple indication units are divided into two categories, one category is a third indication unit, another category is a fourth indication unit, the number of slot indication parameters configured in the reference signal resource set of the third indication unit is less than the number of slot indication parameters configured in the reference signal resource set of the fourth indication unit, For the indication of the slot indication parameter t across the indication unit, an upper bit or a lower bit in a SOI field corresponding to the third indication unit may be filled with 0 or 1, so that the bit width of the SOI field corresponding to the third indication unit is equal to the bit width of the SOI field corresponding to the fourth indication unit, and then the bits in the SOI field corresponding to the third indication unit is used for indicating or selecting the value of the slot indication parameter in the reference signal resource set of the fourth indication unit. For example, the SOI field with 1 bit on the CC 0 or the CC 2 is used, a t value on the CC 1 across CC is indicated, then the upper bit or the lower bit of the SOI field on the CC 0 or the CC 2 is filled with 0 or 1, so that a bit width of the SOI field on the CC 0 or the CC 2 is the same as a bit width of the SOI field on the CC 1, and then t value on the CC 1 is indicated through the SOI field on the CC 0 or the CC 2 after filling with the value. The filled bits are combined with original bits (2 bits in total), and the number $2^2 = 4$ of t values at most are indicated. The above example is equally applicable to multiple BWPs in a CC.

In an embodiment, a format of the DCI corresponding to the reference signal resource set is non DCI 2-3.

In this embodiment, the format of the DCI may be a format other than the DCI 2-3. If the format of the DCI is DCI 2-3, i.e., the reference signal resource set is a resource set used by or associated with DCI 2-3, then the configuration of t is ignored.

In an embodiment, the indication unit includes a component carrier (CC) and/or a bandwidth part (BWP).

In an embodiment, the SOI field is used for indicating a value of a slot indication parameter in a reference signal resource set of a terminal or selecting a slot indication parameter in a reference signal resource set of a terminal; and the reference signal includes an SRS;

the terminal sends the reference signal in each of triggered reference signal resource sets of the indication unit in a (t+1)-th available slot according to the t value indicated by the SOI field in the received DCI in a case of being configured with a carrier aggregation-slot offset parameter (ca-SlotOffset), where the reference signal mainly refers to the SRS, and the available slot is counted from following slots:

$$\left\lfloor n \cdot \frac{2^{\mu_{SRS}}}{2^{\mu_{PDCCH}}} \right\rfloor + k + \left\lfloor \left( \frac{N_{slot,offset,PDCCH}^{CA}}{2^{\mu_{offset,PDCCH}}} - \frac{N_{slot,offset,SRS}^{CA}}{2^{\mu_{offset,SRS}}} \right) \cdot 2^{\mu_{SRS}} \right\rfloor; \text{ or}$$

$$\left\lfloor (n+k) \cdot \frac{2^{\mu_{SRS}}}{2^{\mu_{PDCCH}}} \right\rfloor + \left\lfloor \left( \frac{N_{slot,offset,PDCCH}^{CA}}{2^{\mu_{offset,PDCCH}}} - \frac{N_{slot,offset,SRS}^{CA}}{2^{\mu_{offset,SRS}}} \right) \cdot 2^{\mu_{SRS}} \right\rfloor;$$

the terminal sends the reference slot in each of triggered reference signal resource sets of the indication unit in a (t+1)-th available slot according to the t value indicated by the SOI field in the received DCI in a case of being not configured with a carrier aggregation-slot offset parameter, where the available slot is counted from following slots:

$$\left\lfloor n \cdot \frac{2^{\mu_{SRS}}}{2^{\mu_{PDCCH}}} \right\rfloor + k; \text{ or } \left\lfloor (n+k) \cdot \frac{2^{\mu_{SRS}}}{2^{\mu_{PDCCH}}} \right\rfloor;$$

where t is the slot indication parameter, n is a slot index for receiving the DCI, k is a slot offset parameter configured for each of triggered SRS resource set of the indication unit in a higher layer parameter, k is associated with a subcarrier spacing of a triggered SRS transmission, $\mu_{SRS}$ is a subcarrier spacing of a triggered SRS transmission, $\mu_{PDCCH}$ is a subcarrier spacing of a physical downlink control channel (PDCCH) carrying a trigger command, $$N_{slot,offset,PDCCH}^{CA}$$

is the carrier aggregation-slot offset parameter configured for a cell receiving the PDCCH and represents a slot offset between a primary cell and a secondary cell or between a primary secondary cell and a secondary cell, $\mu_{offset,PDCCH}$ is the maximum of the lowest subcarrier spacing configuration (i.e., a largest value of the lowest subcarrier spacing configuration) among subcarrier spacings configured in a higher layer parameter for the cell receiving the PDCCH, $$N_{slot,offset,SRS}^{CA}$$

is the carrier aggregation-slot offset parameter configured for a cell sending the SRS and represents a slot offset between a primary cell and a secondary cell or between a primary secondary cell and a secondary cell, and $\mu_{offset,SRS}$ is the maximum of the lowest subcarrier spacing configuration (i.e., a largest value of the lowest subcarrier spacing configuration) among subcarrier spacings configured in a higher layer parameter for the cell sending the SRS.

On this basis, whether the terminal is configured with the carrier aggregation-slot offset parameter, the reference signal may be accurately transmitted according to the indication of the SOI field, whereby the flexibility and reliability of transmission of the reference signal is improved. In this embodiment, the terminal (user equipment, UE) receives the DCI triggering the aperiodic SRS on the slot n, and excludes a case where the SRS is configured with a higher layer parameter SRS-PosResource-r16. In an embodiment, the SOI field is used for indicating the value of the slot indication parameter in the reference signal resource set of the terminal or selecting the slot indication parameter in the reference signal resource set of the terminal; and the reference signal includes an SRS;

the terminal sends the reference signal in each of triggered reference signal resource sets of the indication unit in a following slot according to the t value indicated by the SOI field in the received DCI in a case of being configured with a carrier aggregation-slot offset parameter:

$$\left\lfloor n \cdot \frac{2^{\mu_{SRS}}}{2^{\mu_{PDCCH}}} \right\rfloor + k + \left\lfloor \left( \frac{N_{slot,offset,PDCCH}^{CA}}{2^{\mu_{offset,PDCCH}}} - \frac{N_{slot,offset,SRS}^{CA}}{2^{\mu_{offset,SRS}}} \right) \cdot 2^{\mu_{SRS}} \right\rfloor + t; \text{ or}$$

$$\left\lfloor (n+k) \cdot \frac{2^{\mu_{SRS}}}{2^{\mu_{PDCCH}}} \right\rfloor + \left\lfloor \left( \frac{N_{slot,offset,PDCCH}^{CA}}{2^{\mu_{offset,PDCCH}}} - \frac{N_{slot,offset,SRS}^{CA}}{2^{\mu_{offset,SRS}}} \right) \cdot 2^{\mu_{SRS}} \right\rfloor + t;$$

the terminal sends the reference signal in each of triggered reference signal resource sets of the indication unit in a following slot in a case of being not configured with a carrier aggregation-slot offset parameter:

$$\left\lfloor n \cdot \frac{2^{\mu_{SRS}}}{2^{\mu_{PDCCH}}} \right\rfloor + k + t; \text{ or } \left\lfloor (n+k) \cdot \frac{2^{\mu_{SRS}}}{2^{\mu_{PDCCH}}} \right\rfloor + t;$$

where t is the slot indication parameter, n is a slot index for receiving the DCI, k is a slot offset parameter configured for each of triggered SRS resource sets in a higher layer parameter, k is associated with a subcarrier spacing of a triggered SRS transmission, $\mu_{SRS}$ is a subcarrier spacing of a triggered SRS transmission, $\mu_{PDCCH}$ is a subcarrier spacing of a physical downlink control channel (PDCCH) carrying a trigger command, $$N_{slot,offset,PDCCH}^{CA}$$

is the carrier aggregation-slot offset parameter configured for a cell receiving the PDCCH and represents a slot offset between a primary cell and a secondary cell or between a primary secondary cell and a secondary cell configured, $\mu_{offset,PDCCH}$ is the maximum of the lowest subcarrier spacing configuration (i.e., a largest value of the lowest subcarrier spacing configuration) among subcarrier spacings configured in a higher layer parameter for the cell receiving the PDCCH, $$N^{CA}_{slot,offset,SRS}$$

is the carrier aggregation-slot offset parameter configured for a cell sending the SRS and represents a slot offset between a primary cell and a secondary cell or between a primary secondary cell and a secondary cell, and $\mu_{offset,SRS}$ is the maximum of the lowest subcarrier spacing configuration (i.e., a largest value of the lowest subcarrier spacing configuration) among subcarrier spacings configured in a higher layer parameter for the cell sending the SRS.

In the embodiments of the present application, a reference signal sending method is further provided, and the SRS may be sent accurately for each indication unit according to the slot offset indicated across the SOI field of the indication unit.

FIG. 2 is a flowchart of a reference signal sending method provided in an embodiment, as shown in FIG. 2, the method provided in this embodiment includes a step 210 and a step S220.

In step 210, downlink control information (DCI) is received, where the DCI includes a slot offset indication (SOI) field, a bit width of the SOI field is determined according to the number of slot indication parameters configured in a reference signal resource set of an indication unit.

In step 220, a reference signal is sent according to the slot offset indication field.

In an embodiment, a bit width of the SOI field is determined according to a maximum value of the numbers of slot indication parameters configured in reference signal resource sets of all indication units; and where a bit width of a SOI field corresponding to each indication unit is the same.

In an embodiment, the multiple indication units include a first indication unit and a second indication unit, the first indication unit includes an indication unit of which the number of slot indication parameters configured in the reference signal resource set is less than the maximum value, and the second indication unit includes an indication unit of which the number of slot indication parameters configured in the reference signal resource set is equal to the maximum value; and all or part of bits in a SOI field corresponding to the first indication unit is used for indicating a value of a slot indication parameter in a reference signal resource set of the second indication unit or selecting a slot indication parameter in a reference signal resource set of the second indication unit.

In an embodiment, the multiple indication units include a first indication unit and a second indication unit, the first indication unit includes an indication unit of which the number of slot indication parameters configured in the reference signal resource set is less than the maximum value, and the second indication unit includes an indication unit of which the number of slot indication parameters configured in the reference signal resource set is equal to the maximum value; and part of bits in a SOI field corresponding to the second indication unit is used for indicating a value of a slot indication parameter in a reference signal resource set of the first indication unit or selecting a slot indication parameter in a reference signal resource set of the first indication unit.

In an embodiment, a bit width of a SOI field corresponding to each indication unit is determined according to the number of slot indication parameters configured in a reference signal resource set of each indication unit.

In an embodiment, the multiple indication units include a third indication unit and a fourth indication unit, the number of slot indication parameters configured in a reference signal resource set of the third indication unit is less than the number of slot indication parameters configured in a reference signal resource set of the fourth indication unit; and part of bits in a SOI field corresponding to the fourth indication unit is used for indicating a value of a slot indication parameter in a reference signal resource set of the third indication unit or selecting a slot indication parameter in a reference signal resource set of the third indication unit.

In an embodiment, the multiple indication units include a third indication unit and a fourth indication unit, the number of slot indication parameters configured in a reference signal resource set of the third indication unit is less than the number of slot indication parameters configured in a reference signal resource set of the fourth indication unit; where after an upper bit or a lower bit in a SOI field corresponding to the third indication unit is filled with 0 or 1, bits in the SOI field corresponding to the third indication unit is used for indicating a value of a slot indication parameter in the reference signal resource set of the fourth indication unit or selecting a slot indication parameter in the reference signal resource set of the fourth indication unit; and a size of the SOI field corresponding to the third indication unit after the upper bit or the lower bit of the SOI field corresponding to the third indication unit is filled with 0 or 1 is equal to a size of a SOI field corresponding to the fourth indication unit.

In an embodiment, a format of the DCI corresponding to the reference signal resource set is non DCI 2-3.

In an embodiment, the indication unit includes a component carrier (CC) and/or a bandwidth part (BWP).

In an embodiment, the SOI field is used for indicating a value of a slot indication parameter in a reference signal resource set of a terminal or selecting a slot indication parameter in a reference signal resource set of a terminal; and the reference signal includes an SRS;

the step 220 includes the following.

The reference signal is sent, according to the slot offset indication field, in each of triggered reference signal resource sets in a (t+1)-th available slot in a case of being configured with a carrier aggregation-slot offset parameter, where the available slot is counted from following slots:

$$\left\lfloor n \cdot \frac{2^{\mu_{SRS}}}{2^{\mu_{PDCCH}}} \right\rfloor + k + \left\lfloor \left( \frac{N^{CA}_{slot,offset,PDCCH}}{2^{\mu_{offset,PDCCH}}} - \frac{N^{CA}_{slot,offset,SRS}}{2^{\mu_{offset,SRS}}} \right) \cdot 2^{\mu_{SRS}} \right\rfloor; \text{ or}$$

$$\left\lfloor (n+k) \cdot \frac{2^{\mu_{SRS}}}{2^{\mu_{PDCCH}}} \right\rfloor + \left\lfloor \left( \frac{N^{CA}_{slot,offset,PDCCH}}{2^{\mu_{offset,PDCCH}}} - \frac{N^{CA}_{slot,offset,SRS}}{2^{\mu_{offset,SRS}}} \right) \cdot 2^{\mu_{SRS}} \right\rfloor;$$

The reference signal is sent in each of triggered reference signal resource sets in a (t+1)-th available slot in a case of being not configured with a carrier aggregation-slot offset parameter, where the available slot is counted from following slots:

$$\left\lfloor n \cdot \frac{2^{\mu_{SRS}}}{2^{\mu_{PDCCH}}} \right\rfloor + k; \text{ or } \left\lfloor (n+k) \cdot \frac{2^{\mu_{SRS}}}{2^{\mu_{PDCCH}}} \right\rfloor$$

where t is the slot indication parameter, n is a slot index for receiving the DCI, k is a slot offset parameter configured for each of triggered SRS resource sets in a higher layer parameter, k is associated with a subcarrier spacing of a triggered SRS transmission, $\mu_{SRS}$ is a subcarrier spacing of a triggered SRS transmission, $\mu_{PDCCH}$ is a subcarrier spacing of a physical downlink control channel (PDCCH) carrying a trigger command, $$N^{CA}_{slot,offset,PDCCH}$$

is the carrier aggregation-slot offset parameter configured for a cell receiving the PDCCH and represents a slot offset between a primary cell and a secondary cell or between a primary secondary cell and a secondary cell, $\mu_{offset,PDCCH}$ is the maximum of the lowest subcarrier spacing configuration (i.e., a largest value of the lowest subcarrier spacing configuration) among subcarrier spacings configured in a higher layer parameter for the cell receiving the PDCCH, $$N^{CA}_{slot,offset,SRS}$$

is the carrier aggregation-slot offset parameter configured for a cell sending the SRS and represents a slot offset between a primary cell and a secondary cell or between a primary secondary cell and a secondary cell, and $\mu_{offset, PDCCH}$ is the maximum of the lowest subcarrier spacing configuration (i.e., a largest value of the lowest subcarrier spacing configuration) among subcarrier spacings configured in a higher layer parameter for the cell sending the SRS.

In an embodiment, the SOI field is used for indicating a value of a slot indication parameter in a reference signal resource set of a terminal or selecting a slot indication parameter in a reference signal resource set of a terminal; and the reference signal includes an SRS;

the step 220 includes the following.

the reference signal is sent in each of triggered reference signal resource sets in a following slot in a case of being configured with a carrier aggregation-slot offset parameter:

$$\left\lfloor n \cdot \frac{2^{\mu_{SRS}}}{2^{\mu_{PDCCH}}} \right\rfloor + k + \left\lfloor \left( \frac{N^{CA}_{slot,offset,PDCCH}}{2^{\mu_{offset,PDCCH}}} - \frac{N^{CA}_{slot,offset,SRS}}{2^{\mu_{offset,SRS}}} \right) \cdot 2^{\mu_{SRS}} \right\rfloor + t; \text{ or}$$

$$\left\lfloor (n+k) \cdot \frac{2^{\mu_{SRS}}}{2^{\mu_{PDCCH}}} \right\rfloor + \left\lfloor \left( \frac{N^{CA}_{slot,offset,PDCCH}}{2^{\mu_{offset,PDCCH}}} - \frac{N^{CA}_{slot,offset,SRS}}{2^{\mu_{offset,SRS}}} \right) \cdot 2^{\mu_{SRS}} \right\rfloor + t;$$

The reference signal is sent in each of triggered reference signal resource sets in a following slot in a case of being not configured with a carrier aggregation-slot offset parameter:

$$\left\lfloor n \cdot \frac{2^{\mu_{SRS}}}{2^{\mu_{PDCCH}}} \right\rfloor + k + t; \text{ or } \left\lfloor (n+k) \cdot \frac{2^{\mu_{SRS}}}{2^{\mu_{PDCCH}}} \right\rfloor + t;$$

where t is the slot indication parameter, n is a slot index for receiving the DCI, k is a slot offset parameter configured for each of triggered SRS resource sets in a higher layer parameter, k is associated with a subcarrier spacing of a triggered SRS transmission, $\mu_{SRS}$ is a subcarrier spacing of a triggered SRS transmission, $\mu_{PDCCH}$ is a subcarrier spacing of a physical downlink control channel (PDCCH) carrying a trigger command, $$N^{CA}_{slot,offset,PDCCH}$$

is the carrier aggregation-slot offset parameter configured for a cell receiving the PDCCH and represents a slot offset between a primary cell and a secondary cell or between a primary secondary cell and a secondary cell, $N^{CA}_{offset,PDCCH}$ is the maximum of the lowest subcarrier spacing configuration (i.e., a largest value of the lowest subcarrier spacing configuration) among subcarrier spacings configured in a higher layer parameter for the cell receiving the PDCCH, $$N^{CA}_{slot,offset,SRS}$$

is the carrier aggregation-slot offset parameter configured for a cell sending the SRS and represents a slot offset between a primary cell and a secondary cell or between a primary secondary cell and a secondary cell, and $\mu_{offset, PDCCH}$ is the maximum of the lowest subcarrier spacing configuration (i.e., a largest value of the lowest subcarrier spacing configuration) among subcarrier spacings configured in a higher layer parameter for the cell sending the SRS.

An embodiment of the present application further provides an indication device. FIG. 3 is a schematic structural diagram of an indication device provided in an embodiment. As shown in FIG. 3, the indication device includes a width determination module 310 and an information sending module 320. The width determination module 310 is configured to determine a bit width of a slot offset indication (SOI) field according to the number of slot indication parameters configured in a reference signal resource set of an indication unit. The information sending module 320 is configured to send downlink control information (DCI), where the DCI includes the SOI field.

In the indication device of this embodiment, by means of uniformly setting a bit width of a SOI field of each indication unit, so that the indication of crossing the indication unit of an SRS sending slot is achieved, and the reliability and the flexibility of the indication of a reference signal being sending the slot are improved.

In an embodiment, the width determination module 310 is configured to determine a bit width of a SOI field corresponding to each indication unit according to a maximum value of the number of slot indication parameters configured in reference signal resource sets of all indication units; where the bit width of the SOI field corresponding to each indication unit is the same.

In an embodiment, the multiple indication units include a first indication unit and a second indication unit, the first indication unit includes an indication unit of which the number of slot indication parameters configured in the reference signal resource set is less than the maximum value, and the second indication unit includes an indication unit of which the number of slot indication parameters configured in the reference signal resource set is equal to the maximum value; and all or part of bits in a SOI field corresponding to the first indication unit is used for indicating a value of a slot indication parameter in a reference signal resource set of the second indication unit or selecting a slot indication parameter in a reference signal resource set of the second indication unit.

In an embodiment, the multiple indication units include a first indication unit and a second indication unit, the first indication unit includes an indication unit of which the number of slot indication parameters configured in the reference signal resource set is less than the maximum value, and the second indication unit includes an indication unit of which the number of slot indication parameters configured in the reference signal resource set is equal to the maximum value; and part of bits in a SOI field corresponding to the second indication unit is used for indicating a value of a slot indication parameter in a reference signal resource set of the first indication unit or selecting a slot indication parameter in a reference signal resource set of the first indication unit.

In an embodiment, the width determination module 310 is configured to determine a bit width of a SOI field corresponding to each indication unit according to the number of slot indication parameters configured in a reference signal resource set of each indication unit.

In an embodiment, the multiple indication units include a third indication unit and a fourth indication unit, the number of slot indication parameters configured in a reference signal resource set of the third indication unit is less than the number of slot indication parameters configured in a reference signal resource set of the fourth indication unit; and where part of bits in a SOI field corresponding to the fourth indication unit is used for indicating a value of a slot indication parameter in a reference signal resource set of the third indication unit or selecting a slot indication parameter in a reference signal resource set of the third indication unit.

In an embodiment, the multiple indication units include a third indication unit and a fourth indication unit, the number of slot indication parameters configured in a reference signal resource set of the third indication unit is less than the number of slot indication parameters configured in a reference signal resource set of the fourth indication unit; after an upper bit or a lower bit in a SOI field corresponding to the third indication unit is filled with 0 or 1, bits in the SOI field corresponding to the third indication unit is used for indicating a value of a slot indication parameter in the reference signal resource set of the fourth indication unit or selecting a slot indication parameter in the reference signal resource set of the fourth indication unit; and a size of the SOI field corresponding to the third indication unit after the upper bit or the lower bit of the SOI field corresponding to the third indication unit is filled with 0 or 1 is equal to a size of a SOI field corresponding to the fourth indication unit.

In an embodiment, a format of the DCI corresponding to the reference signal resource set is non DCI 2-3.

In an embodiment, the indication unit includes a component carrier (CC) and/or a bandwidth part (BWP).

In an embodiment, the SOI field is used for indicating a value of a slot indication parameter in a reference signal resource set of a terminal or selecting a slot indication parameter in a reference signal resource set of a terminal; the terminal sends the reference signal in each of triggered reference signal resource sets in a (t+1)-th available slot in a case of being configured with a carrier aggregation-slot offset parameter, the reference signal includes an SRS, and the available slot is counted from following slots:

$$\left\lfloor n \cdot \frac{2^{\mu_{SRS}}}{2^{\mu_{PDCCH}}} \right\rfloor + k + \left\lfloor \left( \frac{N^{CA}_{slot,offset,PDCCH}}{2^{\mu_{offset,PDCCH}}} - \frac{N^{CA}_{slot,offset,SRS}}{2^{\mu_{offset,SRS}}} \right) \cdot 2^{\mu_{SRS}} \right\rfloor; \text{ or}$$

$$\left\lfloor (n+k) \cdot \frac{2^{\mu_{SRS}}}{2^{\mu_{PDCCH}}} \right\rfloor + \left\lfloor \left( \frac{N^{CA}_{slot,offset,PDCCH}}{2^{\mu_{offset,PDCCH}}} - \frac{N^{CA}_{slot,offset,SRS}}{2^{\mu_{offset,SRS}}} \right) \cdot 2^{\mu_{SRS}} \right\rfloor;$$

the terminal sends the reference signal in each of triggered reference signal resource sets in a (t+1)-th available slot in a case of being not configured with a carrier aggregation-slot offset parameter, where the available slot is counted from following slots:

$$\left\lfloor n \cdot \frac{2^{\mu_{SRS}}}{2^{\mu_{PDCCH}}} \right\rfloor + k; \text{ or } \left\lfloor (n+k) \cdot \frac{2^{\mu_{SRS}}}{2^{\mu_{PDCCH}}} \right\rfloor;$$

where t is the slot indication parameter, n is a slot index for receiving the DCI, k is a slot offset parameter configured for each of triggered SRS resource sets in a higher layer parameter, k is associated with a subcarrier spacing of a triggered SRS transmission, $\mu_{SRS}$ is a subcarrier spacing of a triggered SRS transmission, $\mu_{PDCCH}$ is a subcarrier spacing of a physical downlink control channel (PDCCH) carrying a trigger command, $$N^{CA}_{slot,offset,PDCCH}$$

is the carrier aggregation-slot offset parameter configured for a cell receiving the PDCCH and represents a slot offset between a primary cell and a secondary cell or between a primary secondary cell and a secondary cell, $\mu_{offset,PDCCH}$ is the maximum of the lowest subcarrier spacing configuration (i.e., a largest value of the lowest subcarrier spacing configuration) among subcarrier spacings configured in a higher layer parameter for the cell receiving the PDCCH, $$N^{CA}_{slot,offset,SRS}$$

is the carrier aggregation-slot offset parameter configured for a cell sending the SRS and represents a slot offset between a primary cell and a secondary cell or between a primary secondary cell and a secondary cell, and $\mu_{offset,SRS}$ is the maximum of the lowest subcarrier spacing configuration (i.e., a largest value of the lowest subcarrier spacing configuration) among subcarrier spacings configured in a higher layer parameter for the cell sending the SRS.

In an embodiment, the SOI field is used for indicating a value of a slot indication parameter in a reference signal resource set of a terminal or selecting a slot indication parameter in a reference signal resource set of a terminal; and the reference signal includes an SRS;

the terminal sends the reference signal in each of triggered reference signal resource sets in a following slot in a case of being configured with a carrier aggregation-slot offset parameter:

$$\left\lfloor n \cdot \frac{2^{\mu_{SRS}}}{2^{\mu_{PDCCH}}} \right\rfloor + k + \left\lfloor \left( \frac{N^{CA}_{slot,offset,PDCCH}}{2^{\mu_{offset,PDCCH}}} - \frac{N^{CA}_{slot,offset,SRS}}{2^{\mu_{offset,SRS}}} \right) \cdot 2^{\mu_{SRS}} \right\rfloor + t; \text{ or}$$

$$\left\lfloor (n+k) \cdot \frac{2^{\mu_{SRS}}}{2^{\mu_{PDCCH}}} \right\rfloor + \left\lfloor \left( \frac{N^{CA}_{slot,offset,PDCCH}}{2^{\mu_{offset,PDCCH}}} - \frac{N^{CA}_{slot,offset,SRS}}{2^{\mu_{offset,SRS}}} \right) \cdot 2^{\mu_{SRS}} \right\rfloor + t;$$

the terminal sends the reference signal in each of triggered reference signal resource sets in a following slot in a case of being not configured with a carrier aggregation-slot offset parameter:

$$\left\lfloor n \cdot \frac{2^{\mu_{SRS}}}{2^{\mu_{PDCCH}}} \right\rfloor + k + t; \text{ or } \left\lfloor (n+k) \cdot \frac{2^{\mu_{SRS}}}{2^{\mu_{PDCCH}}} \right\rfloor + t;$$

where t is the slot indication parameter, n is a slot index for receiving the DCI, k is a slot offset parameter configured for each of triggered SRS resource sets in a higher layer parameter, k is associated with a subcarrier spacing of a triggered SRS transmission, $\mu_{SRS}$ is a subcarrier spacing of a triggered SRS transmission, $\mu_{PDCCH}$ is a subcarrier spacing of a physical downlink control channel (PDCCH) carrying a trigger command, $$N^{CA}_{slot,offset,PDCCH}$$

is the carrier aggregation-slot offset parameter configured for a cell receiving the PDCCH and represents a slot offset between a primary cell and a secondary cell or between a primary secondary cell and a secondary cell, $\mu_{offset,PDCCH}$ is the maximum of the lowest subcarrier spacing configuration (i.e., a largest value of the lowest subcarrier spacing configuration) among subcarrier spacings configured in a higher layer parameter for the cell receiving the PDCCH, $$N^{CA}_{slot,offset,SRS}$$

is the carrier aggregation-slot offset parameter configured for a cell sending the SRS and represents a slot offset between a primary cell and a secondary cell or between a primary secondary cell and a secondary cell, and $\mu_{offset,SRS}$ is the maximum of the lowest subcarrier spacing configuration (i.e., a largest value of the lowest subcarrier spacing configuration) among subcarrier spacings configured in a higher layer parameter for the cell sending the SRS.

The indication device provided in this embodiment belongs to the same concept as the indication method provided in the above-described embodiment, technical details not described in detail in this embodiment may be referred to any of the above-described embodiments, and this embodiment has the same effect as performing the indication method.

An embodiment of the present application further provides a reference signal sending device. FIG. 4 is a schematic structural diagram of a reference signal sending device provided in an embodiment. As shown in FIG. 4, the indication device includes a receiving module 410 and a signal sending module 420. The receiving module 410 is configured to receive downlink control information (DCI), where the DCI includes a slot offset indication (SOI) field, a bit width of the SOI field is determined according to the number of slot indication parameters configured in a reference signal resource set of an indication unit. The signal sending module 420 is configured to send a reference signal according to the slot offset indication field.

The indication device of this embodiment can accurately send SRS for each indication unit according to the slot offset indicated across the SOI field of the indication unit.

In an embodiment, a bit width of the SOI field is determined according to a maximum value of the numbers of slot indication parameters configured in reference signal resource sets of all indication units; and where a bit width of a SOI field corresponding to each indication unit is the same.

In an embodiment, the multiple indication units include a first indication unit and a second indication unit, the first indication unit includes an indication unit of which the number of slot indication parameters configured in the reference signal resource set is less than the maximum value, and the second indication unit includes an indication unit of which the number of slot indication parameters configured in the reference signal resource set is equal to the maximum value; and all or part of bits in a SOI field corresponding to the first indication unit is used for indicating a value of a slot indication parameter in a reference signal resource set of the second indication unit or selecting a slot indication parameter in a reference signal resource set of the second indication unit.

In an embodiment, the multiple indication units include a first indication unit and a second indication unit, the first indication unit includes an indication unit of which the number of slot indication parameters configured in the reference signal resource set is less than the maximum value, and the second indication unit includes an indication unit of which the number of slot indication parameters configured in the reference signal resource set is equal to the maximum value; and part of bits in a SOI field corresponding to the second indication unit is used for indicating a value of a slot indication parameter in a reference signal resource set of the first indication unit or selecting a slot indication parameter in a reference signal resource set of the first indication unit.

In an embodiment, a bit width of a SOI field corresponding to each indication unit is determined according to the number of slot indication parameters configured in a reference signal resource set of each indication unit.

In an embodiment, the multiple indication units include a third indication unit and a fourth indication unit, the number of slot indication parameters configured in a reference signal resource set of the third indication unit is less than the number of slot indication parameters configured in a reference signal resource set of the fourth indication unit; and part of bits in a SOI field corresponding to the fourth indication unit is used for indicating a value of a slot indication parameter in a reference signal resource set of the third indication unit or selecting a slot indication parameter in a reference signal resource set of the third indication unit.

In an embodiment, the multiple indication units include a third indication unit and a fourth indication unit, the number of slot indication parameters configured in a reference signal resource set of the third indication unit is less than the number of slot indication parameters configured in a reference signal resource set of the fourth indication unit; after an upper bit or a lower bit in a SOI field corresponding to the third indication unit is filled with 0 or 1, the bits in the SOI field corresponding to the third indication unit is used for indicating a value of a slot indication parameter in the reference signal resource set of the fourth indication unit or selecting a slot indication parameter in the reference signal resource set of the fourth indication unit; and a size of the SOI field corresponding to the third indication unit after an upper bit or a lower bit in a SOI field corresponding to the third indication unit is filled with 0 or 1, the bits in the SOI field corresponding to the third indication unit is equal to a size of a SOI field corresponding to the fourth indication unit.

In an embodiment, a format of the DCI corresponding to the reference signal resource set is non DCI 2-3.

In an embodiment, the indication unit includes a component carrier (CC) and/or a bandwidth part (BWP).

In an embodiment, the SOI field is used for indicating a value of a slot indication parameter in a reference signal resource set of a terminal or selecting a slot indication parameter in a reference signal resource set of a terminal; and the reference signal includes an SRS;

the signal sending module 420 is configured to perform the following.

The signal sending module 420 sends, according to the slot offset indication field, the reference signal in each of triggered reference signal resource sets in a (t+1)-th available slot in a case of being configured with a carrier aggregation-slot offset parameter, where the available slot is counted from following slots:

$$\left\lfloor n \cdot \frac{2^{\mu_{SRS}}}{2^{\mu_{PDCCH}}} \right\rfloor + k + \left\lfloor \left( \frac{N^{CA}_{slot,offset,PDCCH}}{2^{\mu_{offset,PDCCH}}} - \frac{N^{CA}_{slot,offset,SRS}}{2^{\mu_{offset,SRS}}} \right) \cdot 2^{\mu_{SRS}} \right\rfloor; \text{ or}$$

$$\left\lfloor (n+k) \cdot \frac{2^{\mu_{SRS}}}{2^{\mu_{PDCCH}}} \right\rfloor + \left\lfloor \left( \frac{N^{CA}_{slot,offset,PDCCH}}{2^{\mu_{offset,PDCCH}}} - \frac{N^{CA}_{slot,offset,SRS}}{2^{\mu_{offset,SRS}}} \right) \cdot 2^{\mu_{SRS}} \right\rfloor;$$

The signal sending module 420 sends the reference signal in each of triggered reference signal resource sets in a (t+1)-th available slot in a case of being not configured with a carrier aggregation-slot offset parameter, where the available slot is counted from following slots:

$$\left\lfloor n \cdot \frac{2^{\mu_{SRS}}}{2^{\mu_{PDCCH}}} \right\rfloor + k; \text{ or } \left\lfloor (n+k) \cdot \frac{2^{\mu_{SRS}}}{2^{\mu_{PDCCH}}} \right\rfloor;$$

where t is the slot indication parameter, n is a slot index for receiving the DCI, k is a slot offset parameter configured for each of triggered SRS resource sets in a higher layer parameter, k is associated with a subcarrier spacing of a triggered SRS transmission, $\mu_{SRS}$ is a subcarrier spacing of a triggered SRS transmission, $\mu_{PDCCH}$ is a subcarrier spacing of a physical downlink control channel (PDCCH) carrying a trigger command, $$N^{CA}_{slot,offset,PDCCH}$$

is the carrier aggregation-slot offset parameter configured for a cell receiving the PDCCH and represents a slot offset between a primary cell and a secondary cell or between a primary secondary cell and a secondary cell, $\mu_{offset,PDCCH}$ is the maximum of the lowest subcarrier spacing configuration (i.e., a largest value of the lowest subcarrier spacing configuration) among subcarrier spacings configured in a higher layer parameter for the cell receiving the PDCCH, $$N^{CA}_{slot,offset,SRS}$$

is the carrier aggregation-slot offset parameter configured for a cell sending the SRS and represents a slot offset between a primary cell and a secondary cell or between a primary secondary cell and a secondary cell, and $\mu_{offset,SRS}$ is the maximum of the lowest subcarrier spacing configuration (i.e., a largest value of the lowest subcarrier spacing configuration) among subcarrier spacings configured in a higher layer parameter for the cell sending the SRS.

In an embodiment, the SOI field is used for indicating a value of a slot indication parameter in a reference signal resource set of a terminal or selecting a slot indication parameter in a reference signal resource set of a terminal; and the reference signal includes an SRS;

the signal sending module 420 is configured to perform the following.

the signal sending module 420 sends the reference signal in each of triggered reference signal resource sets in a following slot in a case of being configured with a carrier aggregation-slot offset parameter, $$\left\lfloor n \cdot \frac{2^{\mu_{SRS}}}{2^{\mu_{PDCCH}}} \right\rfloor + k + \left\lfloor \left( \frac{N^{CA}_{slot,offset,PDCCH}}{2^{\mu_{offset,PDCCH}}} - \frac{N^{CA}_{slot,offset,SRS}}{2^{\mu_{offset,SRS}}} \right) \cdot 2^{\mu_{SRS}} \right\rfloor + t; \text{ or}$$

$$\left\lfloor (n+k) \cdot \frac{2^{\mu_{SRS}}}{2^{\mu_{PDCCH}}} \right\rfloor + \left\lfloor \left( \frac{N^{CA}_{slot,offset,PDCCH}}{2^{\mu_{offset,PDCCH}}} - \frac{N^{CA}_{slot,offset,SRS}}{2^{\mu_{offset,SRS}}} \right) \cdot 2^{\mu_{SRS}} \right\rfloor + t;$$

the signal sending module 420 sends the reference signal in each of triggered reference signal resource sets in a following slot in a case of being not configured with a carrier aggregation-slot offset parameter:

$$\left\lfloor n \cdot \frac{2^{\mu_{SRS}}}{2^{\mu_{PDCCH}}} \right\rfloor + k + t; \text{ or } \left\lfloor (n+k) \cdot \frac{2^{\mu_{SRS}}}{2^{\mu_{PDCCH}}} \right\rfloor + t;$$

where t is the slot indication parameter, n is a slot index for receiving the DCI, k is a slot offset parameter configured for each of triggered SRS resource sets in a higher layer parameter, k is associated with a subcarrier spacing of a triggered SRS transmission, $\mu_{SRS}$ is a subcarrier spacing of a triggered SRS transmission, $\mu_{PDCCH}$ is a subcarrier spacing of a physical downlink control channel (PDCCH) carrying a trigger command, $$N^{CA}_{slot,offset,PDCCH}$$

is the carrier aggregation-slot offset parameter configured for a cell receiving the PDCCH and represents a slot offset between a primary cell and a secondary cell or between a primary secondary cell and a secondary cell, $\mu_{offset,PDCCH}$ is the maximum of the lowest subcarrier spacing configuration (i.e., a largest value of the lowest subcarrier spacing configuration) among subcarrier spacings configured in a higher layer parameter for the cell receiving the PDCCH, $$N^{CA}_{slot,offset,SRS}$$

is the carrier aggregation-slot offset parameter configured for a cell sending the SRS and represents a slot offset between a primary cell and a secondary cell or between a primary secondary cell and a secondary cell, and $\mu_{offset,SRS}$ is the maximum of the lowest subcarrier spacing configuration (i.e., a largest value of the lowest subcarrier spacing configuration) among subcarrier spacings configured in a higher layer parameter for the cell sending the SRS.

The reference signal sending device provided in this embodiment belongs to the same concept as the reference signal sending method provided in the above-described embodiment, technical details not described in detail in this embodiment may be referred to any of the above-described embodiments, and this embodiment has the same effect as performing the reference signal sending method.

An embodiment of the present application further provides a communication node. The above-described indication method applied to the communication node may be performed by an indication device, the indication device may be implemented by means of software and/or hardware and integrated in the communication node (such as, a base station). The above-described reference signal sending method may be performed by a reference signal sending device, the reference signal sending device may be implemented by means of software and/or hardware and integrated in the communication node (such as, a terminal).

Figure 5:
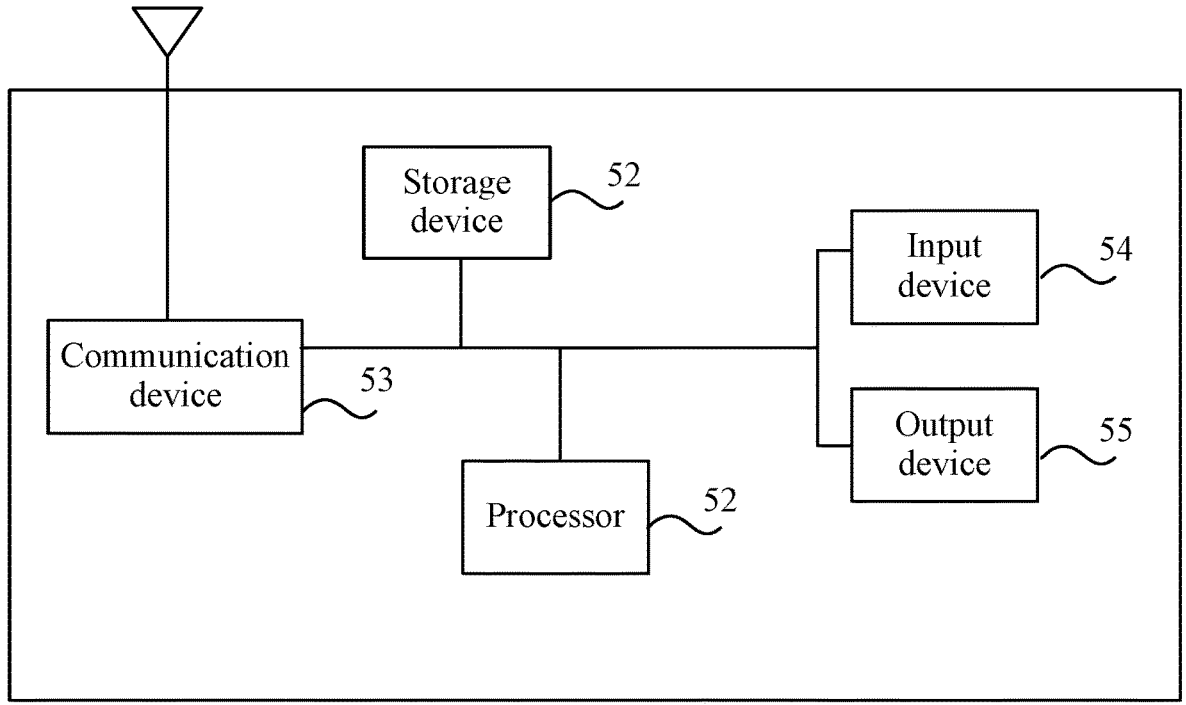
FIG. 5 is a schematic diagram of a hardware structure of a communication node provided in an embodiment.

FIG. 5 is a schematic diagram of a hardware structure of a communication node provided in an embodiment. As shown in FIG. 5, the communication node provided in the present application includes one or more processors 51, where the one or more processors 51, when executed, implement the indication method or the reference signal sending method provided in any of the embodiments of the present application, and correspondingly, the communication node is a network side node or a terminal side node.

The communication node may further include a storage device 52; the number of processors 51 in the communication node may be one or more, and one processor 51 is used as an example in FIG. 5; the storage device 52 is configured to store one or more programs; the one or more programs, when executed by the one or more processors 51, cause the one or more processors 51 to implement the indication method or the reference signal sending method described in the embodiments of the present application.

The communication node further includes a communication device 53, an input device 54 and an output device 55.

The processor 51, the storage device 52, the communication device 53, the input device 54 and the output device 55 in the communication node may be connected by a bus or other means, for example, and they being connected by a bus is used as an example in FIG. 5.

The input device 54 may be configured to receive input digital or character information and to generate a key signal input related to user settings and functional control of the communication node. The output device 55 may include a display apparatus such as a display screen.

The communication device 53 may include a receiver and a sender. The communication device 53 is configured to perform an information transceiving communication according to the control of the processor 51.

The storage device 52 serves as a computer-readable storage medium and may be configured to store a software program, a computer executable program and a module, such as a program instruction/module (such as, the width determination module 310 and the information sending module 320) corresponding to the indication method described in the embodiments of the present application. The storage device 52 may include a storage program region and a storage data region, where the storage program region may store an operating system, an application program required for at least one function; the storage data region may store data or the like created according to the use of the communication node. Moreover, the storage device 52 may include a high-speed random access memory and may also include a non-volatile memory, such as at least one magnetic disk storage device, flash memory device, or other non-volatile solid-state memory devices. In some instances, the storage device 52 may include a memory remotely disposed with respect to the processor 51, these remote memories may be connected to the communication node over a network. Instances of such networks include, but are not limited to, an Internet, an intranet, a local area network, a mobile communication network, and combinations thereof.

An embodiment of the present application further provides a storage medium. The storage medium stores a computer program, and the computer program, when executed by a processor, implements the indication method or the reference signal sending method described in any one of the embodiments of the present application.

The indication method includes that: a bit width of a slot offset indication (SOI) field is determined according to the number of slot indication parameters configured in a reference signal resource set of an indication unit; and downlink control information (DCI) is sent, where the DCI includes the SOI field.

The reference signal sending method includes that: a bit width of a slot offset indication (SOI) field is determined according to the number of slot indication parameters configured in a reference signal resource set of an indication unit; and downlink control information (DCI) is sent, where the DCI includes the SOI field.

The computer storage media of the embodiments of the present application may adopt any combination of one or more computer-readable media. The computer-readable medium may be a computer-readable signal medium or a computer-readable storage medium. The computer-readable storage medium may be, for example, but not limited to, an electronic, magnetic, optical, electromagnetic, infrared, or semiconductor system, apparatus, or device, or any combination of the foregoing. Examples (a non-exhaustive list) of the computer-readable storage medium include: an electrical connection having one or more wires, a portable computer diskette, a hard disk, a random access memory (RAM), a read-only memory (ROM), an erasable programmable read-only memory (EPROM), a flash memory, an optical fiber, a portable compact disc read-only memory (CD-ROM), an optical storage device, a magnetic storage device, or any suitable combination of the foregoing. The computer-readable storage medium may be any tangible medium that contains or stores a program, and the program may be used by or in connection with an instruction execution system, apparatus, or device.

The computer-readable signal medium may include a propagated data signal with a computer-readable program code carried therein, for example, in a baseband or as part of a carrier wave. Such a propagated data signal may adopt a variety of forms, including, but not limited to: an electromagnetic signal, an optical signal, or any suitable combination of the foregoing. The computer-readable signal medium may be any computer-readable medium that is not a computer-readable storage medium and that may send, propagate, or transport a program for use by or in connection with an instruction execution system, apparatus, or device.

A program code embodied on the computer-readable medium may be transmitted using any appropriate medium, including but not limited to: wireless, wire, optic cable, radio frequency (RF), etc., or any suitable combination of the foregoing.

A computer program code for performing the operations of the present application may be written in one or more programming languages or combinations thereof, the described programming languages include an object-oriented programming language, such as Java, Smalltalk, C++, and further include a conventional procedural programming language, such as a "C" language or similar programming language. The program code may be executed in following manners: executed entirely on a user's computer, executed partly on the user's computer, executed as an independent software package, executed partly on the user's computer and partly on a remote computer, or executed entirely on the remote computer or a server. In a case where the remote computer is involved, the remote computer may be connected to the user's computer through any kind of network, including a local area network (LAN) or a wide area network (WAN), or may be connected to an external computer (for example, connected to the external computer through an internet provided by an internet service provider).

The above description is only an exemplary embodiment of the present application.

It should be understood by those skilled in the art that the term terminal covers any suitable type of wireless user equipment, such as a mobile phone, a portable data processing device, a portable web browser or a vehicle mobile station.

In general, various embodiments of the present application may be implemented in hardware or special purpose circuits, software, logic or any combination thereof. For example, some aspects may be implemented in hardware, while other aspects may be implemented in firmware or software which may be executed by a controller, microprocessor or other computing device, although the present application is not limited thereto.

Embodiments of the present application may be implemented by a data processor of a mobile device executing computer program instructions, for example in a processor entity, or by hardware, or by a combination of software and hardware. The computer program instructions may be assembler instructions, instruction set architecture (ISA) instructions, machine instructions, machine-related instructions, microcode, firmware instructions, state setting data, or source or object codes written in any combination of one or more programming languages.

Any block diagram of the logic flow in the accompanying drawings of the present application may represent program steps, or may represent interconnected logic circuits, modules, and functions, or may represent a combination of program steps and logic circuits, modules, and functions. The computer program may be stored on a memory. The memory may be of any type suitable for the local technical environment and may be implemented using any suitable data storage technology, such as, but not limited to, a read-only memory (ROM), a random access memory (RAM), an optical memory device and system (digital versatile disc (DVD) or compact disk (CD)), etc. The computer-readable medium may include a non-instantaneous storage medium. The data processor may be of any type suitable for the local technical environment, such as, but not limited to, general-purpose computers, specialized computers, microprocessors, digital signal processors (DSP), application specific integrated circuits (ASIC), field-programmable gate array (FPGA)), and processors based on multi-core processor architectures.

What is claimed is:

1. A sounding reference signal (SRS) transmission method, the method comprising:

receiving downlink control information (DCI) including a slot offset indication (SOI) field, wherein the SOI field indicates a value of a slot indication parameter in a SRS resource set of a terminal and a bit width of the SOI field is determined according to a number of slot indication parameters configured in a SRS resource set of a component carrier (CC); and in response to the terminal being configured with a carrier aggregation-slot offset parameter, sending a SRS in each of at least one triggered SRS resource set in a $(t+1)^{th}$ available slot according to the SOI field, wherein the $(t+1)^{th}$ available slot is counted from slot:

$$\left\lfloor n \cdot \frac{2^{\mu_{SRS}}}{2^{\mu_{PDCCH}}} \right\rfloor + k + \left\lfloor \left( \frac{N^{CA}_{slot,offset,PDCCH}}{2^{\mu_{offset,PDCCH}}} - \frac{N^{CA}_{slot,offset,SRS}}{2^{\mu_{offset,SRS}}} \right) \cdot 2^{\mu_{SRS}} \right\rfloor;$$

wherein t is the slot indication parameter, n is a slot index for receiving the DCI, k is a slot offset parameter configured for each of the at least one triggered SRS resource set in a first higher layer parameter, and k is associated with a subcarrier spacing of a triggered SRS transmission, μSRS is the subcarrier spacing of the triggered SRS transmission, μPDCCH is a subcarrier spacing of a physical downlink control channel (PDCCH) carrying a trigger command, $$N^{CA}_{slot,offset,PDCCH}$$

is the carrier aggregation-slot offset parameter configured for a cell receiving the PDCCH and represents a slot offset between a primary cell and a secondary cell or between a primary secondary cell and a secondary cell, $\mu_{offset,PDCCH}$ is a largest value of the lowest subcarrier spacing configuration among subcarrier spacings configured in a second higher layer parameter for the cell receiving the PDCCH, $$N^{CA}_{slot,offset,SRS}$$

is the carrier aggregation-slot offset parameter configured for a cell sending the SRS and represents a slot offset between a primary cell and a secondary cell or between a primary secondary cell and a secondary cell, and $\mu_{offset,SRS}$ is the largest value of the lowest subcarrier spacing configuration among subcarrier spacings configured in the second higher layer parameter for the cell sending the SRS.

2. The method of claim 1, wherein a bit width of the SOI field is determined according to a maximum value of numbers of slot indication parameters configured in SRS resource sets of all of a plurality of CCs; and a bit width of a SOI field corresponding to each CC of the plurality of CCs is the same.

3. The method of claim 2, wherein
the plurality of CCs comprises a first CC and a second CC, the first CC comprises a CC of which the number of slot indication parameters configured in the SRS resource set is less than the maximum value, and the second CC comprises a CC of which the number of slot indication parameters configured in the SRS resource set is equal to the maximum value; and
all or part of bits in a SOI field corresponding to the first CC is used for indicating a value of a slot indication parameter in a SRS resource set of the second CC or selecting a slot indication parameter in a SRS resource set of the second CC.

4. The method of claim 2, wherein
the plurality of CCs comprises a first CC and a second CC, the first CC comprises a CC of which the number of slot indication parameters configured in the SRS resource set is less than the maximum value, and the second CC comprises a CC of which the number of slot indication parameters configured in the SRS resource set is equal to the maximum value; and
part of bits in a SOI field corresponding to the second CC is used for indicating a value of a slot indication parameter in a SRS resource set of the first CC or selecting a slot indication parameter in a SRS resource set of the first CC.

5. The method of claim 2, wherein a bit width of a SOI field corresponding to each CC is determined according to a number of slot indication parameters configured in a SRS resource set of each CC.

6. The method of claim 5, wherein
the plurality of CCs comprises a third CC and a fourth CC, a number of slot indication parameters configured in a SRS resource set of the third CC is less than a number of slot indication parameters configured in a SRS resource set of the fourth CC; and
part of bits in a SOI field corresponding to the fourth CC is used for indicating a value of a slot indication parameter in a SRS resource set of the third CC or selecting a slot indication parameter in a SRS resource set of the third CC.

7. The method of claim 5, wherein
the plurality of CCs comprises a third CC and a fourth CC, a number of slot indication parameters configured in a SRS resource set of the third CC is less than a number of slot indication parameters configured in a SRS resource set of the fourth CC;
after an upper bit or a lower bit in a SOI field corresponding to the third CC is filled with 0 or 1, bits in the SOI field corresponding to the third CC is used for indicating a value of a slot indication parameter in the SRS resource set of the fourth CC or selecting a slot indication parameter in the SRS resource set of the fourth CC; and
a size of the SOI field corresponding to the third CC after the upper bit or the lower bit in the SOI field corresponding to the third CC is filled with 0 or 1 is equal to a size of a SOI field corresponding to the fourth CC.

8. A sounding reference signal (SRS) transmission apparatus, the apparatus comprising:
a memory operable to store computer-readable instructions; and
a processor circuitry operable to read the computer-readable instructions, the processor circuitry when executing the computer-readable instructions is configured to:
receive downlink control information (DCI) including a slot offset indication (SOI) field, wherein the SOI field indicates a value of a slot indication parameter in a SRS resource set of a terminal and a bit width of the SOI field is determined according to a number of slot indication parameters configured in a SRS resource set of a component carrier (CC); and
in response to the terminal being configured with a carrier aggregation-slot offset parameter, send a SRS in each of at least one triggered SRS resource set in a $(t+1)^{th}$ available slot according to the SOI field, wherein the $(t+1)^{th}$ available slot is counted from slot:

$$\left[ n \cdot \frac{2^{\mu_{SRS}}}{2^{\mu_{PDCCH}}} \right] + k + \left[ \left( \frac{N_{slot,offset,PDCCH}^{CA}}{2^{\mu_{offset,PDCCH}}} - \frac{N_{slot,offset,SRS}^{CA}}{2^{\mu_{offset,SRS}}} \right) \cdot 2^{\mu_{SRS}} \right];$$

wherein t is the slot indication parameter, n is a slot index for receiving the DCI, k is a slot offset parameter configured for each of the at least one triggered SRS resource set in a first higher layer parameter, and k is associated with a subcarrier spacing of a

24 triggered SRS transmission, $\mu_{SRS}$ is the subcarrier spacing of the triggered SRS transmission, $\mu_{PDCCH}$ is a subcarrier spacing of a physical downlink control channel (PDCCH) carrying a trigger command, $$N_{slot,offset,PDCCH}^{CA}$$

is the carrier aggregation-slot offset parameter configured for a cell receiving the PDCCH and represents a slot offset between a primary cell and a secondary cell or between a primary secondary cell and a secondary cell, $\mu_{offset,PDCCH}$ is a largest value of the lowest subcarrier spacing configuration among subcarrier spacings configured in a second higher layer parameter for the cell receiving the PDCCH, $$N_{slot,offset,SRS}^{CA}$$

is the carrier aggregation-slot offset parameter configured for a cell sending the SRS and represents a slot offset between a primary cell and a secondary cell or between a primary secondary cell and a secondary cell, and $\mu_{offset,SRS}$ is the largest value of the lowest subcarrier spacing configuration among subcarrier spacings configured in the second higher layer parameter for the cell sending the SRS.

9. The apparatus of claim 8, wherein a bit width of the SOI field is determined according to a maximum value of numbers of slot indication parameters configured in SRS resource sets of all of a plurality of CCs; and a bit width of a SOI field corresponding to each CC of the plurality of CCs is the same.

10. The apparatus of claim 9, wherein
the plurality of CCs comprises a first CC and a second CC, the first CC comprises a CC of which the number of slot indication parameters configured in the SRS resource set is less than the maximum value, and the second CC comprises a CC of which the number of slot indication parameters configured in the SRS resource set is equal to the maximum value; and
all or part of bits in a SOI field corresponding to the first CC is used for indicating a value of a slot indication parameter in a SRS resource set of the second CC or selecting a slot indication parameter in a SRS resource set of the second CC.

11. The apparatus of claim 9, wherein
the plurality of CCs comprises a first CC and a second CC, the first CC comprises a CC of which the number of slot indication parameters configured in the SRS resource set is less than the maximum value, and the second CC comprises a CC of which the number of slot indication parameters configured in the SRS resource set is equal to the maximum value; and
part of bits in a SOI field corresponding to the second CC is used for indicating a value of a slot indication parameter in a SRS resource set of the first CC or selecting a slot indication parameter in a SRS resource set of the first CC.

12. The apparatus of claim 8, wherein a bit width of a SOI field corresponding to each CC is determined according to a number of slot indication parameters configured in a SRS resource set of each CC.

13. The apparatus of claim 12, wherein
the plurality of CCs comprises a third CC and a fourth CC, a number of slot indication parameters configured in a SRS resource set of the third CC is less than a number
of slot indication parameters configured in a SRS
resource set of the fourth CC; and part of bits in a SOI field corresponding to the fourth CC
is used for indicating a value of a slot indication
parameter in a SRS resource set of the third CC or
selecting a slot indication parameter in a SRS resource
set of the third CC.

14. The apparatus of claim 12, wherein the plurality of CCs comprises a third CC and a fourth CC,
a number of slot indication parameters configured in a
SRS resource set of the third CC is less than a number
of slot indication parameters configured in a SRS
resource set of the fourth CC;

after an upper bit or a lower bit in a SOI field correspond-
ing to the third CC is filled with 0 or 1, bits in the SOI
field corresponding to the third CC is used for indicat-
ing a value of a slot indication parameter in the SRS
resource set of the fourth CC or selecting a slot indi-
cation parameter in the SRS resource set of the fourth
CC; and a size of the SOI field corresponding to the third CC after
the upper bit or the lower bit in the SOI field corre-
sponding to the third CC is filled with 0 or 1 is equal
to a size of a SOI field corresponding to the fourth CC.

15. A sounding reference signal (SRS) transmission
method, the method comprising:

transmitting downlink control information (DCI) includ-
ing a slot offset indication (SOI) field to a terminal,
wherein the SOI field indicates a value of a slot
indication parameter in a SRS resource set of the
terminal and a bit width of the SOI field is determined
according to a number of slot indication parameters
configured in a SRS resource set of a component carrier
(CC); and receiving from the terminal a SRS in each of at least one
triggered SRS resource set in a $(t+1)^{th}$ available slot
according to the SOI field, wherein the $(t+1)^{th}$ available
slot is counted from slot:

$$\left\lfloor n \cdot \frac{2^{\mu_{SRS}}}{2^{\mu_{PDCCH}}} \right\rfloor + k + \left\lfloor \left( \frac{N_{slot,offset,PDCCH}^{CA}}{2^{\mu_{offset,PDCCH}}} - \frac{N_{slot,offset,SRS}^{CA}}{2^{\mu_{offset,SRS}}} \right) \cdot 2^{\mu_{SRS}} \right\rfloor;$$

wherein t is the slot indication parameter, n is a slot index
for receiving the DCI, k is a slot offset parameter
configured for each of the at least one triggered SRS
resource set in a first higher layer parameter, and k is
associated with a subcarrier spacing of a triggered SRS
transmission, $\mu_{SRS}$ is the subcarrier spacing of the
triggered SRS transmission, $\mu_{PDCCH}$ is a subcarrier
spacing of a physical downlink control channel
(PDCCH) carrying a trigger command, $$N_{slot,offset,PDCCH}^{CA}$$

is a carrier aggregation-slot offset parameter configured for
a cell receiving the PDCCH and represents a slot offset
between a primary cell and a secondary cell or between a
primary secondary cell and a secondary cell, $\mu_{offset,PDCCH}$ is
a largest value of the lowest subcarrier spacing configuration
among subcarrier spacings configured in a second higher
layer parameter for the cell receiving the PDCCH, $$N_{slot,offset,SRS}^{CA}$$

is the carrier aggregation-slot offset parameter configured
for a cell sending the SRS and represents a slot offset
between a primary cell and a secondary cell or between a
primary secondary cell and a secondary cell, and $\mu_{offset,SRS}$ is
the largest value of the lowest subcarrier spacing configu-
ration among subcarrier spacings configured in the second
higher layer parameter for the cell sending the SRS.

16. The method of claim 15, wherein a bit width of the
SOI field is determined according to a maximum value of
numbers of slot indication parameters configured in SRS
resource sets of all of a plurality of CCs; and a bit width of
a SOI field corresponding to each CC of the plurality of CCs
is the same.

17. A sounding reference signal (SRS) transmission appa-
ratus, the apparatus comprising:

a memory operable to store computer-readable instruc-
tions; and a processor circuitry operable to read the computer-
readable instructions, the processor circuitry when
executing the computer-readable instructions is config-
ured to:

transmit downlink control information (DCI) including
a slot offset indication (SOI) field to a terminal,
wherein the SOI field indicates a value of a slot
indication parameter in a SRS resource set of the
terminal and a bit width of the SOI field is deter-
mined according to a number of slot indication
parameters configured in a SRS resource set of a
component carrier (CC); and receive from the terminal a SRS in each of at least one
triggered SRS resource set in a $(t+1)^{th}$ available slot
according to the SOI field, wherein the $(t+1)^{th}$ avail-
able slot is counted from slot:

$$\left\lfloor n \cdot \frac{2^{\mu_{SRS}}}{2^{\mu_{PDCCH}}} \right\rfloor + k + \left\lfloor \left( \frac{N_{slot,offset,PDCCH}^{CA}}{2^{\mu_{offset,PDCCH}}} - \frac{N_{slot,offset,SRS}^{CA}}{2^{\mu_{offset,SRS}}} \right) \cdot 2^{\mu_{SRS}} \right\rfloor;$$

wherein t is the slot indication parameter, n is a slot
index for receiving the DCI, k is a slot offset param-
eter configured for each of the at least one triggered
SRS resource set in a first higher layer parameter,
and k is associated with a subcarrier spacing of a
triggered SRS transmission, $\mu_{SRS}$ is the subcarrier
spacing of the triggered SRS transmission, $\mu_{PDCCH}$ is
a subcarrier spacing of a physical downlink control
channel (PDCCH) carrying a trigger command, $$N_{slot,offset,PDCCH}^{CA}$$

is a carrier aggregation-slot offset parameter configured for
a cell receiving the PDCCH and represents a slot offset
between a primary cell and a secondary cell or between a
primary secondary cell and a secondary cell, $\mu_{offset,PDCCH}$ is
a largest value of the lowest subcarrier spacing configuration
among subcarrier spacings configured in a second higher
layer parameter for the cell receiving the PDCCH, $$N_{slot,offset,SRS}^{CA}$$

is the carrier aggregation-slot offset parameter configured for a cell sending the SRS and represents a slot offset between a primary cell and a secondary cell or between a primary secondary cell and a secondary cell, and $\mu_{offset,SRS}$ is the largest value of the lowest subcarrier spacing configuration among subcarrier spacings configured in the second higher layer parameter for the cell sending the SRS.

18. The apparatus of claim 17, wherein a bit width of a SOI field corresponding to each CC is determined according to a number of slot indication parameters configured in a SRS resource set of each CC.

* * * * *